(12) United States Patent
Jong et al.

(10) Patent No.: US 12,323,851 B2
(45) Date of Patent: Jun. 3, 2025

(54) BACKWARD COMPATIBLE PHYSICAL LAYER AND SIGNALING FOR SATELLITE COMMUNICATION

(71) Applicant: Hughes Network Systems, LLC, Germantown, MD (US)

(72) Inventors: James J. Jong, North Potomac, MD (US); Channasandra Ravishankar, Clarksburg, MD (US); William Whitmarsh, San Diego, CA (US); Nassir Benammar, Rockville, MD (US); Santharam Gurumani, Frederick, MD (US); Pablo Valle, San Diego, CA (US); Jianxia Luo, San Diego, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 18/479,967

(22) Filed: Oct. 3, 2023

(65) Prior Publication Data

US 2024/0107372 A1 Mar. 28, 2024

Related U.S. Application Data

(63) Continuation of application No. 17/182,899, filed on Feb. 23, 2021, now Pat. No. 11,778,508.

(Continued)

(51) Int. Cl.
*H04W 28/04* (2009.01)
*H04L 1/00* (2006.01)
(Continued)

(52) U.S. Cl.
CPC ........... *H04W 28/04* (2013.01); *H04L 1/0005* (2013.01); *H04L 1/0061* (2013.01); *H04W 80/02* (2013.01); *H04W 92/10* (2013.01)

(58) Field of Classification Search
None
See application file for complete search history.

(56) References Cited

U.S. PATENT DOCUMENTS

2009/0285164 A1\* 11/2009 Chin ..................... H04L 1/0072
370/329
2013/0028175 A1 1/2013 Jong et al.

FOREIGN PATENT DOCUMENTS

KR 20180124657 A \* 11/2018 ............... H04L 1/20
WO 2014140877 A2 9/2014
(Continued)

OTHER PUBLICATIONS

ETSI TS 101 376-4-12 V3.5.1 (Mar. 2017), GEO-Mobile Radio Interface Specifications (Release 3) (Year: 2017).\*
(Continued)

*Primary Examiner* — Intekhaab A Siddiquee
(74) *Attorney, Agent, or Firm* — Capitol City TechLaw; Jasbir Singh

(57) ABSTRACT

A method for communicating with a legacy terminal supporting a legacy air interface and a new terminal supporting a next generation air interface including: assigning a same carrier to the legacy terminal and the new terminal; receiving a terminal identifier and an optional payload for transmission at a MAC/RLC layer; determining if the terminal identifier is associated with the legacy terminal or the new terminal; composing, based on the determining, a burst header; formatting, a burst including the burst header and the optional payload; and transmitting the burst. In the method, the burst header is set to one of the one or more valid burst headers when the burst is associated with the legacy terminal, and the burst header is set to one of the one or more undefined burst headers when the burst is associated with the new terminal.

15 Claims, 6 Drawing Sheets

Related U.S. Application Data

(60) Provisional application No. 62/981,494, filed on Feb. 25, 2020.

(51) Int. Cl.
  *H04W 80/02* (2009.01)
  *H04W 92/10* (2009.01)

(56) References Cited

FOREIGN PATENT DOCUMENTS

| | | |
|---|---|---|
| WO | 2016105568 A1 | 6/2016 |
| WO | 2019217850 | 11/2019 |

OTHER PUBLICATIONS

Communication relating to the results of the partial International search for PCT Application No. PCT/2021/019256.
Cristina Cano et al: "Fair Coexistence of Scheduled and Random Access Wireless Networks: Unlicensed LTE/WiFi", arxiv.org, Cornell University Library, 201 Olin Library Cornell University Ithaca, NY 14853, May 2, 2016, XP080698794.
ETSI TS 101 376-4-12 GEO-Mobile Radio Interface Specifications (Release 3); Radio interface physical layer specifications; Radio Link Control/Medium Access Control (RLC/MAC) protocol; GMR-1 3G 44.060, 2017.
ETSI TS 101 376-5-2 GEO-Mobile Radio Interface Specifications (Release 3); Radio interface physical layer specifications; Multiplexing and Multiple Access; GMR-1 3G 45.002, 2017.
GEO-Mobile Radio Interface Specifications—ETSI TS 101 376-4-12 v3.5.1 (Mar. 2017) (Year:2017).
GEO-Mobile Radio Interface Specifications—ETSI TS 101 376-5-2 v3.5.1 (Mar. 2017) (Year:2017).
"GEO-Mobile Radio Interface Specifications (Release 3) Third Generation Satellite Packet Radio Service; Part 5: Radio interface physical layer specifications; Sub part 3: Channel Coding; GMR-1 3G 45.003", ETSI Draft; GMR-1 3G 45.003 V307, European Telecommunications Standards Institute (ETSI), 650, Route Des Lucioles ; F-06921 Sophia-Antipolis ; France, No. V3.0.7, Feb. 6, 2009 (Feb. 6, 2009), pp. 1-97, XP014052641, [retrieved on Feb. 6, 2009] * From Section 9.1 p. 46 to end of section 9.1.1b. 1.1 p. 47.
Extended Search Report for EP 24193541.0, dated Nov. 25, 2024.

\* cited by examiner

|←——20 ms (2340 symbols)——→|

| G 12.5 | UW 25 | PUI 24 | TR 5 | Ext. PUI 48 | UL MAP# 96 | UW 14 | UL MAP# 160 | PRI 878 | UW 13 | PRI 1038 | UW 14 | G 12.5 |
|---|---|---|---|---|---|---|---|---|---|---|---|---|

FIG. 7A

|←——20 ms (2340 symbols)——→|

| G 12.5 | UW 25 | PUI 24 | TR 5 | Ext. PUI 48 | UL MAP# 96 | UW 14 | UL MAP# 92 | CH 92 | PRI 878 | UW 13 | PRI 1038 | UW 14 | G 12.5 |
|---|---|---|---|---|---|---|---|---|---|---|---|---|---|

FIG. 7B

|←——5 ms (585 symbols)——→|

| G 12.5 | UW 25 | PUI 24 | TR 5 | Ext. PUI 48 | UL MAP# 42 | PRI 54 | UW 14 | PRI 335 | UW 13 | G 12.5 |
|---|---|---|---|---|---|---|---|---|---|---|

FIG. 7C

|←——5 ms (585 symbols)——→|

| G 12.5 | UW 25 | PUI 24 | TR 5 | ULMAP# 90 | PRI 54 | UW 14 | PRI 335 | UW 13 | G 12.5 |
|---|---|---|---|---|---|---|---|---|---|

FIG. 7D

BACKWARD COMPATIBLE PHYSICAL LAYER AND SIGNALING FOR SATELLITE COMMUNICATION

CROSS-REFERENCE TO RELATED APPLICATIONS AND INCORPORATION BY REFERENCE

The present application is a continuation of U.S. application Ser. No. 17/182,899, filed Feb. 23, 2021 (now issued as U.S. Pat. No. 11,778,508), which claims the benefit under 35 U.S.C. 119(e) of U.S. Provisional Application Ser. No. 62/981,494, filed Feb. 25, 2020, which are all incorporated herein by reference in their entireties.

FIELD

A system and method to enable a satellite network to assign a same carrier to both existing terminals supporting a legacy air interface and new terminals supporting a next generation air interface is disclosed. The teachings include signaling schemes and physical control channel reception and handling methods the for new terminals.

BACKGROUND

In a Time Division Multiple Access (TDMA) network multiple transmitters may share a transmission channel by dividing access to the channel into discrete time slots. Once a transmitter has accessed the network, for example, through a Random Access Channel (RACH), a dynamic bandwidth scheduler may provide a transmitter with bandwidth allocations on the shared channel, which allocations are non-overlapping in time for the shared channel.

In addition to TDMA, satellite communication systems assign a first frequency to legacy terminals and a different second frequency to new terminals because the types of decoders available in the new and legacy air interfaces are disjoint. The legacy air interface uses Turbo code, while the next generation air interface supports Turbo and new LDPC code rates. Legacy terminals are not equipped with the new LDPC decoder. The different frequency assignments reduce overall system capacity, in particular, when the traffic load for each carrier is low. For example, when the time utilization of the carrier by the legacy terminal is 10% and the new terminal is 30%, the system still uses two carriers and the overall utilization per carrier is 20%. However, if the next generation air interface is designed such that legacy terminals can operate on the same carrier as the new terminals, the utilization becomes 40% in the above example, which is twice the utilization achieved with two separate dedicated carriers. The legacy air interface mentioned in the example includes GMR-1 3G (uses the Turbo code) and GMR-1 2.5G (also known as GMPRS-1; uses slow LDPC code rates). The next generation air interface includes new LDPC code rates that the legacy GMR-1 2.5G terminals do not support. The present teachings are applicable to both legacy 2.5 G and 3G terminals.

The present teachings enable a use of the same carrier by both legacy and new terminals, improving the system utilization (or throughput) significantly.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for communicating with a legacy terminal supporting a legacy air interface and a new terminal supporting a next generation air interface. The method includes assigning a same carrier to the legacy terminal and the new terminal; receiving a terminal identifier and an optional payload for transmission at a MAC/RLC (media access layer/radio link control) layer; determining if the terminal identifier is associated with the legacy terminal or the new terminal; composing, based on the determining, a burst header; formatting, a burst including the burst header and the optional payload; and transmitting the burst. In the method, the legacy air interface defines one or more valid burst headers and one or more undefined burst headers, the burst header is set to one of the one or more valid burst headers when the burst is associated with the legacy terminal, and the burst header is set to one of the one or more undefined burst headers when the burst is associated with the new terminal. Other embodiments of this aspect include corresponding computer systems, apparatus, and computer programs recorded on one or more computer storage devices, each configured to perform the actions of the methods.

Implementations may include one or more of the following features. The method where the next generation air interface supports a MCS (modulation and coding scheme) unsupported by the legacy air interface. The method where the next generation air interface supports a ULMAP (uplink map). The method where at least of the one or more undefined burst headers identifies an MCS unsupported by the legacy air interface. The method where the transmitting of a portion of the burst is in a portion of the same carrier. The method where the same carrier may include a 5× carrier, and the transmitting for the next generation air interface transmits a portion of the burst in a 1× carrier, a 2× carrier or the 5× carrier. The method where the transmitting for the legacy air interface transmits the burst in the 5× carrier. Implementations of the described techniques may include hardware, a method or process, or computer software on a computer-accessible medium.

One general aspect includes a system to communicate with a legacy terminal supporting a legacy air interface and a new terminal supporting a next generation air interface. The system includes a gateway to assign a same carrier to the legacy terminal and the new terminal; a MAC/RLC (media access layer/radio link control) layer to receive a terminal identifier and an optional payload for transmission, to determine if the terminal identifier is associated with the legacy terminal or the new terminal, and to compose, based on the determining, a burst header; a burst formatter to format a burst may include the burst header and the optional payload, and a transmitter to transmit the burst. In the system, the legacy air interface defines one or more valid burst headers and one or more undefined burst headers, the burst header is set to one of the one or more valid burst headers when the burst is associated with the legacy terminal, and the burst header is set to one of the one or more undefined burst headers when the burst is associated with the new terminal.

One or more computer programs can be configured to perform particular operations or actions by virtue of including instructions that, when executed by data processing apparatus, cause the apparatus to perform the actions. One general aspect includes a method for processing a burst at a terminal supporting a next generation air interface may include receiving burst comprising an extended PUI (public user information); checking an integrity of the extended PUI with a colored CRC (Cyclic Redundancy Check); and extracting a ULMAP from the burst when the ULMAP is indicated to be present by the extended PUI.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 7A and FIG. 7B each illustrate an exemplary 20 ms burst format according to various embodiments.

FIG. 7C and FIG. 7D each illustrate an exemplary 5 ms burst format according to various embodiments.

Figure 8:
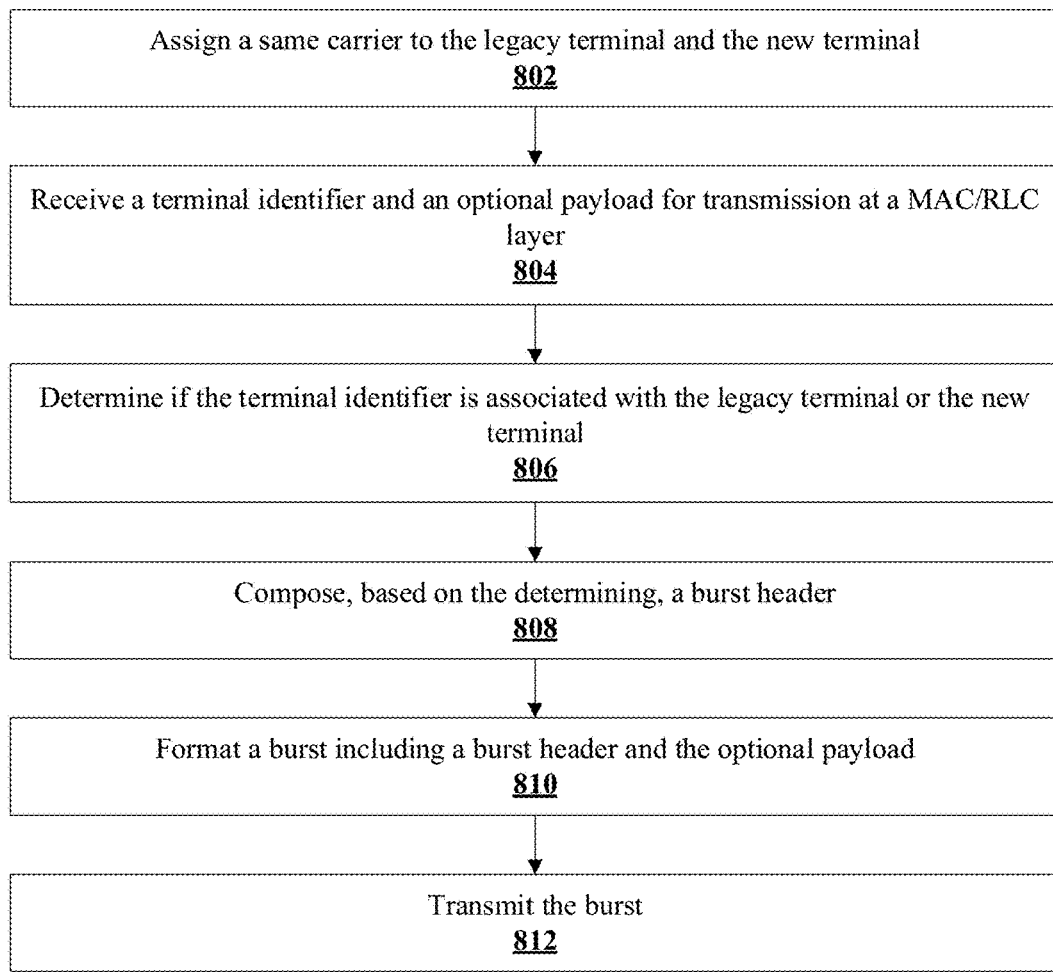

FIG. 8 illustrates a method for communicating with a legacy terminal supporting a legacy air interface and a new terminal supporting a next generation air interface according to various embodiments.

Figure 9:
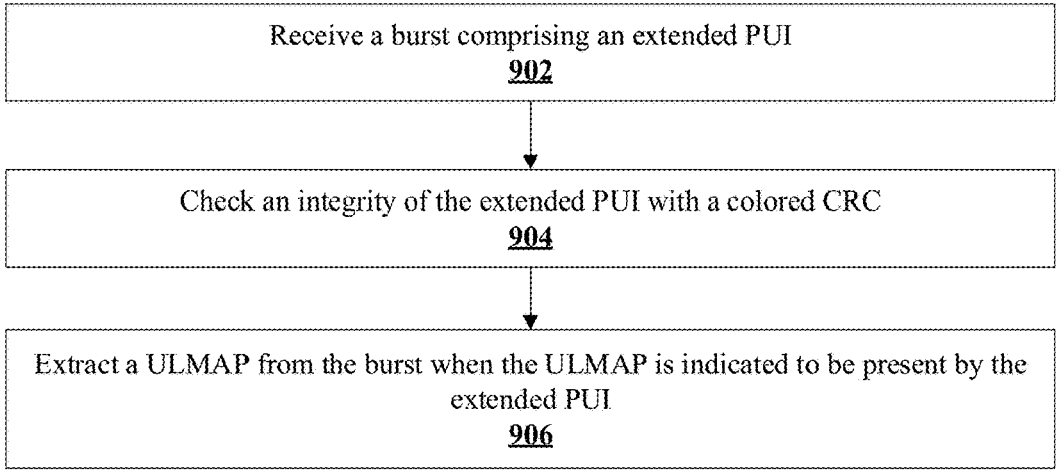

FIG. 9 illustrates a method for processing a burst at a terminal supporting a next generation air interface according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Figure 1:
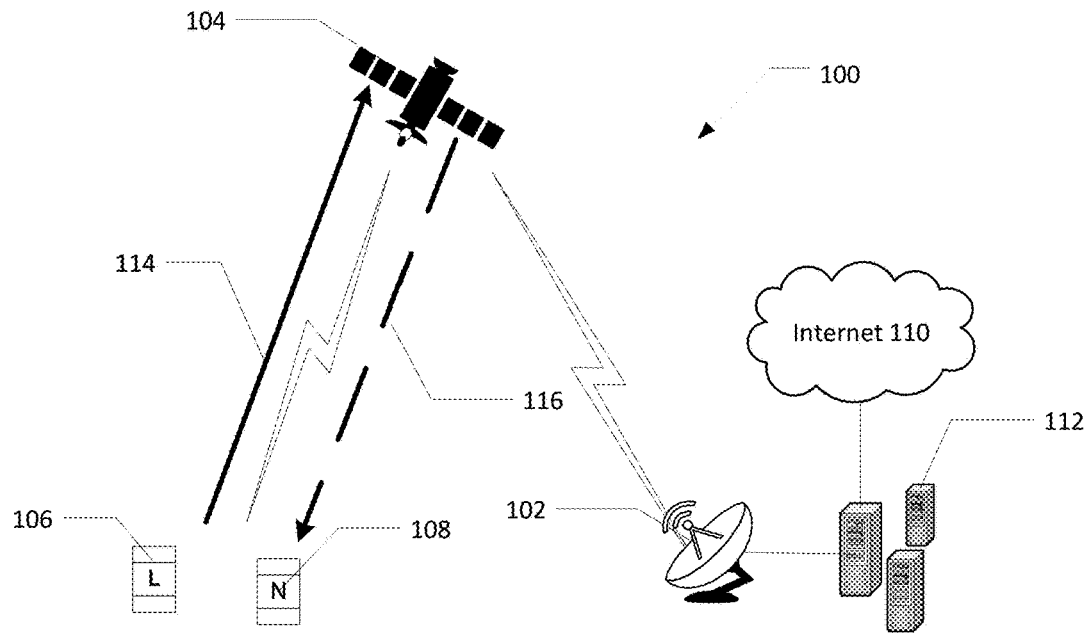
FIG. 1 illustrates a satellite communication network system according to various embodiments.

FIG. 1 illustrates a satellite communication system according to various embodiments.

FIG. 1 illustrates a satellite communication system 100 including a radio gateway 102, a satellite 104, a legacy terminal 106, a new terminal 108, a gateway 112 connected to an external IP network 110 such as the Internet. An uplink 114 may refer to a radio link transmitting from the legacy terminal 106 and the new terminal 108, and received by the satellite 104. A downlink 116 may refer to a radio link transmitting from the satellite 104 and received by the legacy terminal 106 and the new terminal 108. The uplink 114 may be a TDMA channel or radio path. The downlink 116 maybe a TDMA channel. The gateway 112 may include or may communicate with a transceiver (not shown). The legacy terminal 106 may include or may communicate with a transceiver (not shown). The new terminal 108 may include or may communicate with a transceiver (not shown).

Figure 2:
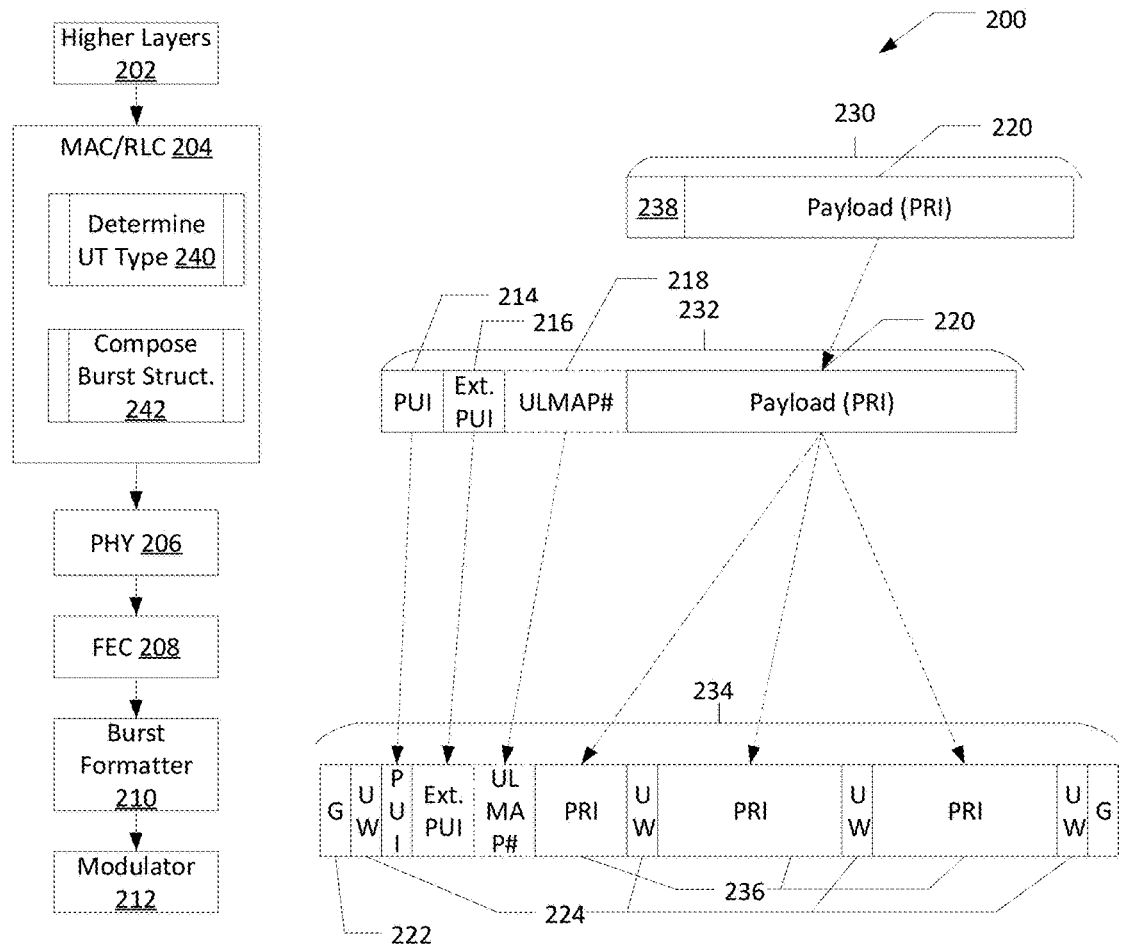
FIG. 2 illustrates a burst and its relation to network layers according to various embodiments.

FIG. 2 illustrates a burst and its relation to network layers according to various embodiments.

A satellite network 200 may function using higher layers 202, a MAC/RLC (Media Access Layer/Radio Link Control) layer 204 and a PHY (physical) layer 206. An output of the PHY layer 206 may be error coded with a FEC (Forward Error Control) coder 208, burst formatted with a burst formatter 210 and modulated with a modulator 212 prior to transmission. The satellite network 200 may assign a same carrier to a legacy terminal supporting a legacy air interface and a new terminal supporting a next generation air interface. In some embodiments, the new terminal may support both the legacy air interface and the next generation air interface.

A MAC/RLC structure 230 may be provided by the higher layers to the MAC/RLC layer 204. The MAC/RLC structure 230 may include, among others, a terminal identifier 238 and a payload (PRI (private information)) 220. In some embodiments, the terminal identifier 238 may be a MAC address. The terminal identifier 238 may be used for determining terminal type at operation 240 (legacy or next generation), for example, with a lookup table. The determined terminal type may be used for composing a burst structure 232 at operation 242. Portions of the burst structure 232 may change by terminal type. Operation 242 may compose the burst structure 232 by generating and including symbols for a PUI (public user information) 214, optionally an extended PUI 216, optionally a ULMAP (uplink map) 218, and optionally the payload 220. The payload 220 of the MAC/RLC structure 230 may be segmented, if necessary, and disposed in one or more of the burst structure 232.

The burst structure 232 is provided to the PHY layer 206 by the MAC/RLC layer 204 to format a burst 234. The burst 234 is a single unit of transmission on a radio path defined in terms of a RF (radio frequency) channel, a RF power profile and modulation symbols. The burst 234 may be sent in a defined time and frequency resource (i.e., time and frequency slots). The burst 234 includes multiple fields: G (guard) periods 222, multiple UWs (unique words) 224, the PUI 214 from the burst structure 232, the extended PUI 216 from the burst structure 232, the ULMAP 218 from the burst structure 232, and PRI symbols 236. The payload 220 may be in-contiguously (as shown) or contiguously disposed as the PRI symbols 236 of the burst 234. In some embodiments, the payload 220 and the PRI symbols 236 may be different.

The fields in a burst 234 or a burst structure 234, and other terms in the present teachings are defined as the following.

Payload/PRI: PRI carries user data and/or control messages. PRI is also termed as payload. The PRI may be error encoded (e.g., Turbo or LDPC) for various rates and modulated differently than other portions of the burst. Exemplary PRI modulation includes π/2 BPSK, π/4 QPSK, 16 APSK, 32 APSK PUI: PUI includes the physical layer related control messages and burst format information. It may include a keep-alive burst indicator (downlink only), and a link adaptation control message (uplink only), burst modulation and coding information, and access permission to the uplink timeslots associated with the downlink timeslots where the burst is received. The PUI includes MCS (Modulation Coding Scheme) information and burst duration for downlink payload, and a USF (Uplink Status Flag) information. The USF carries uplink grant information. Additional uplink grant information is included in the ULMAP.

UL-MAP: The UL-MAP includes an uplink assignment map, which may be FEC encoded with for example convolutional code constraint length 9. This field may be optional and its presence is indicated by PUI.

UW: The UW assists burst synchronization including timing, amplitude, phase, and frequency estimation.

G: The guard provides guard time (along with network synchronization) between the consecutive burst and allows the period for carrier power ramp up and down.

Forward Link: A forward link collectively refers to the link from "gateway to the terminal via the satellite".

Return link: A return link collectively refers to the link from "Terminal to the gateway via the satellite".

Exemplary Approach

Figure 3A:
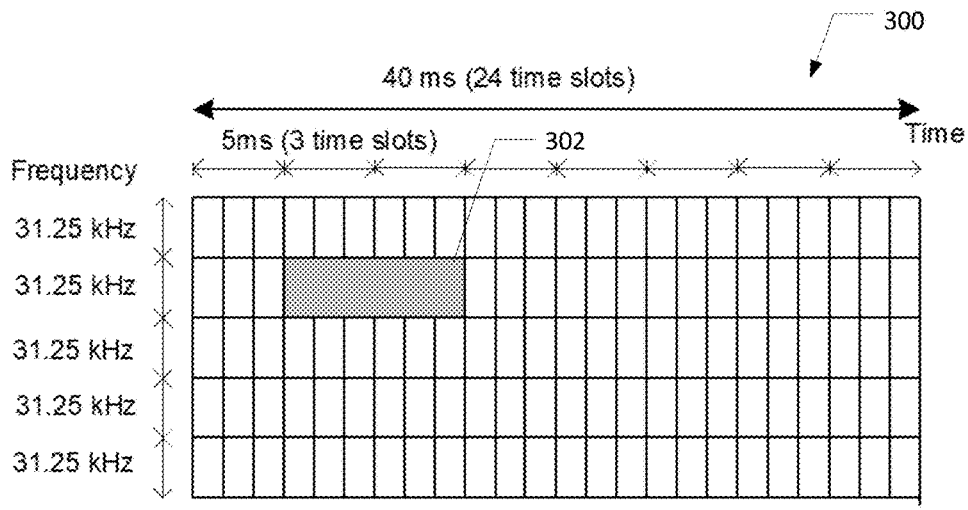
FIG. 3A illustrates an exemplary frequency and time grid used for resource allocation according to various embodiments.

FIG. 3 illustrates an exemplary frequency and time grid used for resource allocation according to various embodiments.

Figure 3B:
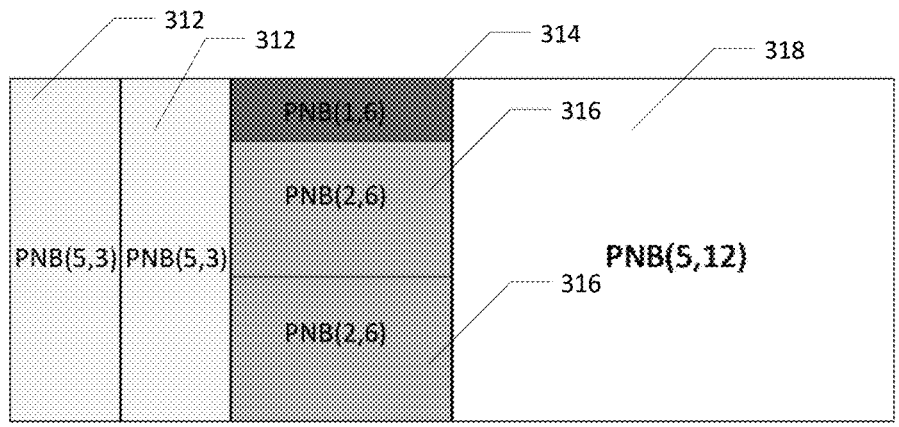
FIG. 3B illustrates an exemplary resource allocation according to various embodiments.

FIG. 3 illustrates an exemplary frequency and time grid 300 used for resource allocation in a network that uses FDMA (Frequency division multiple access) and TDMA jointly. For example, a GMR-1 satellite system is a FDMA/TDMA system. The physical layer resources are allocated in terms of a base frequency (for example, 31.25 kHz) and a time slot (for example, 5/3 ms). Each PNB(m,n) (allocation block) occupies m×31.25 kHz base frequency bands and n x time slots. A PNB 302 illustrates an allocation block of one 31.25 kHz base frequency band and 6 time slots, and may be represented as PNB(1,6). In similar vernacular, a PNB(5,12) (allocation 318 of FIG. 3B) represents a burst occupying a 156.25 kHz (5×31.25 kHz) base frequency band and 20 ms (12×5/3 ms) time slot. In this example, a frame has a duration of 40 ms with 24 time slots. As such, each time slot has a duration of 5/3 ms.

The next generation air interface supports signaling of 1× and 2× uplink allocations in a 5× downlink. The present teachings disclose a new ULMAP field in the next generation downlink bursts. The new burst types may be called PNB4(5,12), PNB4(5,3), PKAB4(5,3) with a ULMAP. These new bursts allow multiplexing of legacy terminals in the same carrier. The guard, UW, PHY header of the burst may remain the same as the legacy air interface. However, adding an additional field in the burst while keeping guard, UW, PHY header would necessitate a reduction in LPDC coded PRI symbols. In order to minimize cost involved in new LDPC code development and terminal memory requirement, already developed (5,3) and (2,6) LDPC code are reused in the following manner:

PNB4(5,12) with ULMAP burst: Four (5,3) LDPC blocks constitute a PRI PNB4(5,3) with ULMAP burst: One (2,6) LDPC block constitute a PRI For 5 ms PNB4(5,3)/PKAB4(5,3) burst with ULMAP, two methods are disclosed. In a method A, three fields in the burst header are used, where the PUI and Ext-PUI portions of the burst header are the same as those of a legacy air interface PNB(5,12) and the ULMAP is similar to the PNB(5,12) ext-PUI. In a method B, the PUI field is per the legacy air interface and the Ext-PUI and ULMAP fields form a combined field in the burst header.

Method A has common structure up to Ext-PUI and as such provides flexibility for future evolution of PNB4(5,3) with PUI and Ext-PUI only. Method B has two fields: PUI and ULMAP, minimizes the number of fields for PNB4(5,3)/PKAB4(5,3) with ULMAP burst, and the terminal may treat the front part (beyond PUI) differently for PNB4(5,3) and PNB4(5,12) processing.

Backward Compatible Next Generation Bursts

To avoid allocating separate subbands to existing legacy and new terminals, the network may TDM the following bursts on the same subband, for example, a 5× carrier subband. Moreover, as the existing legacy terminals cannot process the new burst types, the new burst types need to be designed to be backward compatible with (i.e., no harm to) the legacy terminal operation. The legacy air interface burst formats are:

PNB2(5,12) (may be a subset of PNB4(5,12)),
PNB2(5,3) (may be a subset of PNB4(5,3)), and
PKAB(5,3).

The backward compatible Next generation air interface burst formats are: PNB4(5,12) with ULMAP, PNB4(5,3) with ULMAP and PKAB4(5,3) with ULMAP. In some embodiments, "PKAB4(5,3) with ULMAP" replaces PKAB (5,3) for a simpler network operation and terminal processing with the single PKAB format.

FIG. 3B illustrates an exemplary resource allocation according to various embodiments.

FIG. 3B illustrates different combinations of frequency and time resource allocations in an uplink transmission opportunity conveyed by a ULMAP. The gateway may transmit the USF bits in a downlink burst to the UT to indicate an uplink transmission opportunity, for example, in the burst structure 232. The downlink received by the UT may be a 5× carrier (i.e., m=5), for example. However, the uplink allocation for the UT in the uplink transmission opportunity can be either on 1× carrier (allocation 314), 2× carrier (allocation 316) or 5× carrier (allocation 312 and allocation 318). The allocation for the UT may depend on a UT capability (in terms of max EIRP), a backlog in the UT, available resources in the uplink, or the like. Allocation 312 is for 3 time slots (n=3); allocation 314 and allocation 316 are for 6 time slots (n=6); and allocation 318 is for 12 time slots (n=12).

In some embodiments, a gateway may have to send one or more of the PUI, Ext-PUI and ULMAP field in the downlink burst when the uplink allocation has a mix of different burst types with different slot duration and bandwidth.

Backward Compatible Signaling to Legacy Terminal

A legacy terminal declares a PUI error and treats the burst as not present when the decoded PUI has MCS=0, 1, 2, 9, 12, 13 & 14. These MCS values are called Invalid MCSs. In some embodiments, the Network reserves one of the invalid MCS values (for example MCS=0) in PUI when a gateway transmits PNB4(5,12) with a ULMAP or PNB4(5,3) with a ULMAP. In some embodiments, the network may use the invalid MCS bit string in the PUI and introduce a new 4-bit downlink MCS field in the ULMAP to indicate new PRI MCS. The following table illustrates a legacy terminal's reaction.

| RX burst type | Existing legacy terminal reaction upon burst reception |
| --- | --- |
| PNB4(5,12) | Burst format same as PNB2(5,12): the legacy terminal successfully demodulates and decodes the received burst. Additional dynamic color coding of Ext-PUI CRC may be used to further prevent existing terminals from parsing Ext-PUI (if needed). |
| PNB4(5,3) | Burst format same as PNB2(5,3): the legacy terminal supports demodulating and decoding the received burst. |
| PKAB(5,3) | Burst format same as PKAB(5,3): the legacy terminal supports demodulating and decoding the received burst. |
| PNB4(5,12) with ULMAP | Keep the front part of the burst format & PHY header portion same as PNB2(5,12) and manipulate content of PUI in such a way that the legacy terminals treat this new burst as no burst received. |
| PNB4(5,3) with ULMAP | Keep the front part of the burst format & PHY header portion same as PNB2(5,12) and manipulate content of PUI in such a way that the legacy terminals treat this new burst as no burst received. |
| PKAB4(5,3) with ULMAP | Burst format same as PKAB(5,3) except for appended ULMAP field which does not affect the legacy terminal. |

Figure 4:
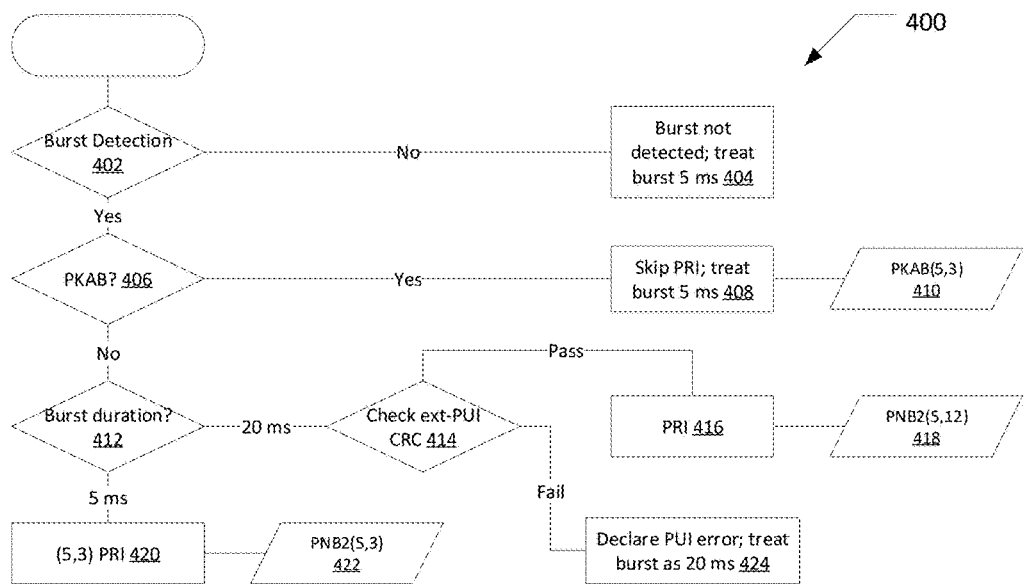
FIG. 4 illustrates a receive processing for a legacy terminal in some embodiments.

FIG. 4 illustrates a receive processing for a legacy terminal in some embodiments.

A process 400 for receive processing for a legacy terminal to handle legacy and next generation burst types over a common carrier is disclosed. The burst types may include burst types PNB2(5,12) 418, PNB2(5,3) 422, and PKAB(5, 3) 410.

A legacy terminal may perform burst detection 402 using a PUI decoder metric and decoded PUI MCS. If the decoder metric is lower than a predefined threshold or if the decoded MCS belong to invalid MCS, the terminal declares a burst not detected per 404 and repeats the receiver process with next received burst; otherwise a burst detected is declared. When a burst detected is declared, the terminal parses PUI and EXT PUI fields and performs the processing as shown per 406, 408, 410, 412, 414, 416, 420 and 424. In some embodiments, as the next generation burst type encodes the PUI MCS field with an invalid MCS, the legacy terminal declares a burst not detected when a new burst type is received.

Figure 5:
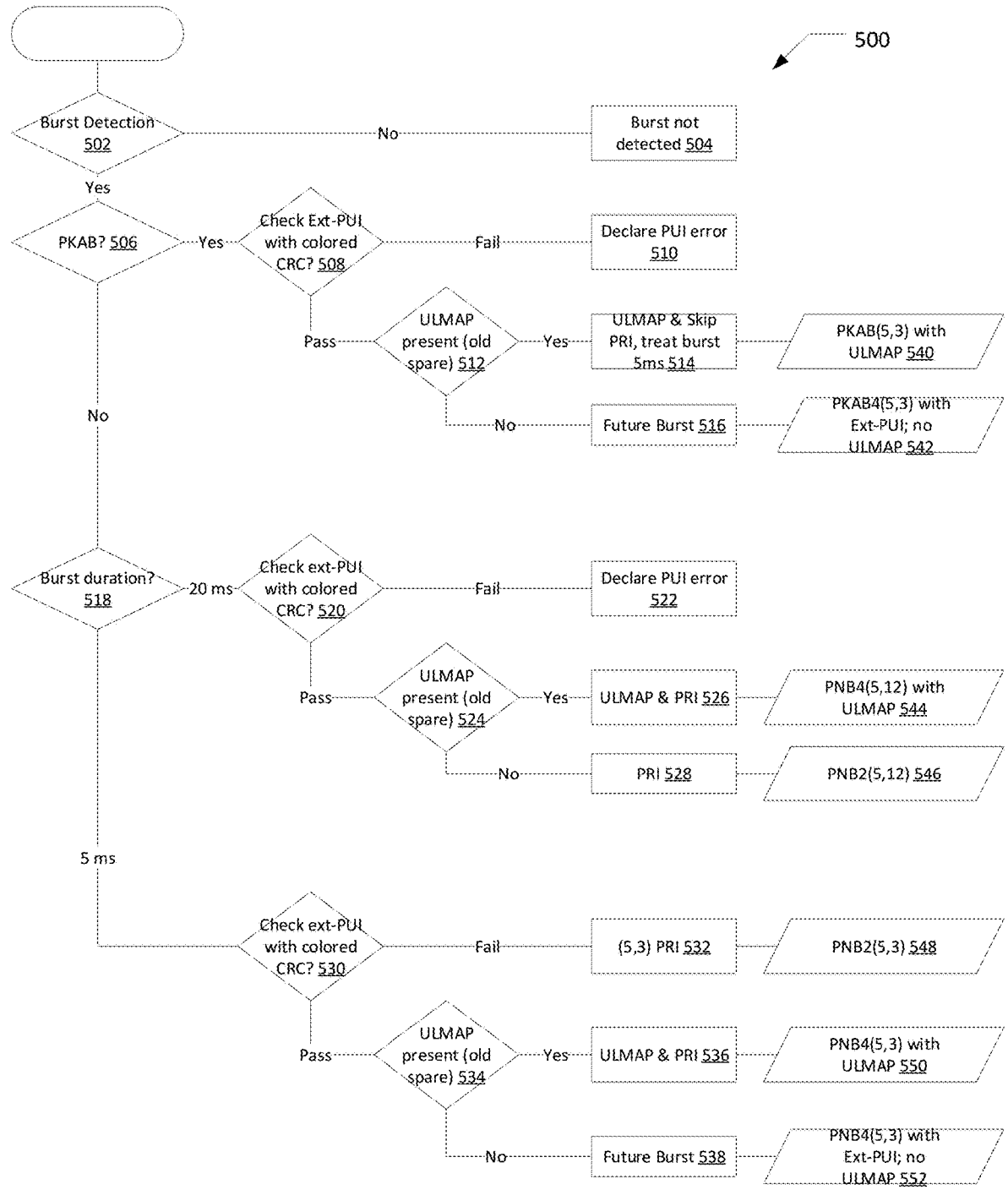
FIG. 5 illustrates a receive processing for a next generation terminal in some embodiments.

FIG. 5 illustrates a receive processing for a next generation terminal in some embodiments.

A process 500 for a new terminal to handle legacy and next generation burst types over a common carrier is disclosed. The burst types may include burst types PKAB(5,3)) 540, PKAB4(5,3) 542, PNB4(5,12) 544, PNB2(5,12) 546, PNB2(5,3) 548, PNB4(5,3) 550, and PNB4(5,3) 552.

A next generation terminal may perform burst detection 502 using a PUI decoder metric and decoded PUI MCS. If the decoder metric is lower than a predefined threshold, the terminal declares a burst not detected per 504 and repeats the receiver process with next received burst; otherwise a burst detected is declared. When a burst detected is declared, the terminal parses PUI and EXT PUI fields and performs the processing as shown per 506, 508, 510, 512, 514, 516, 518, 520, 522, 524, 526, 528, 530, 532, 534, 536 and 538.

Figure 6:
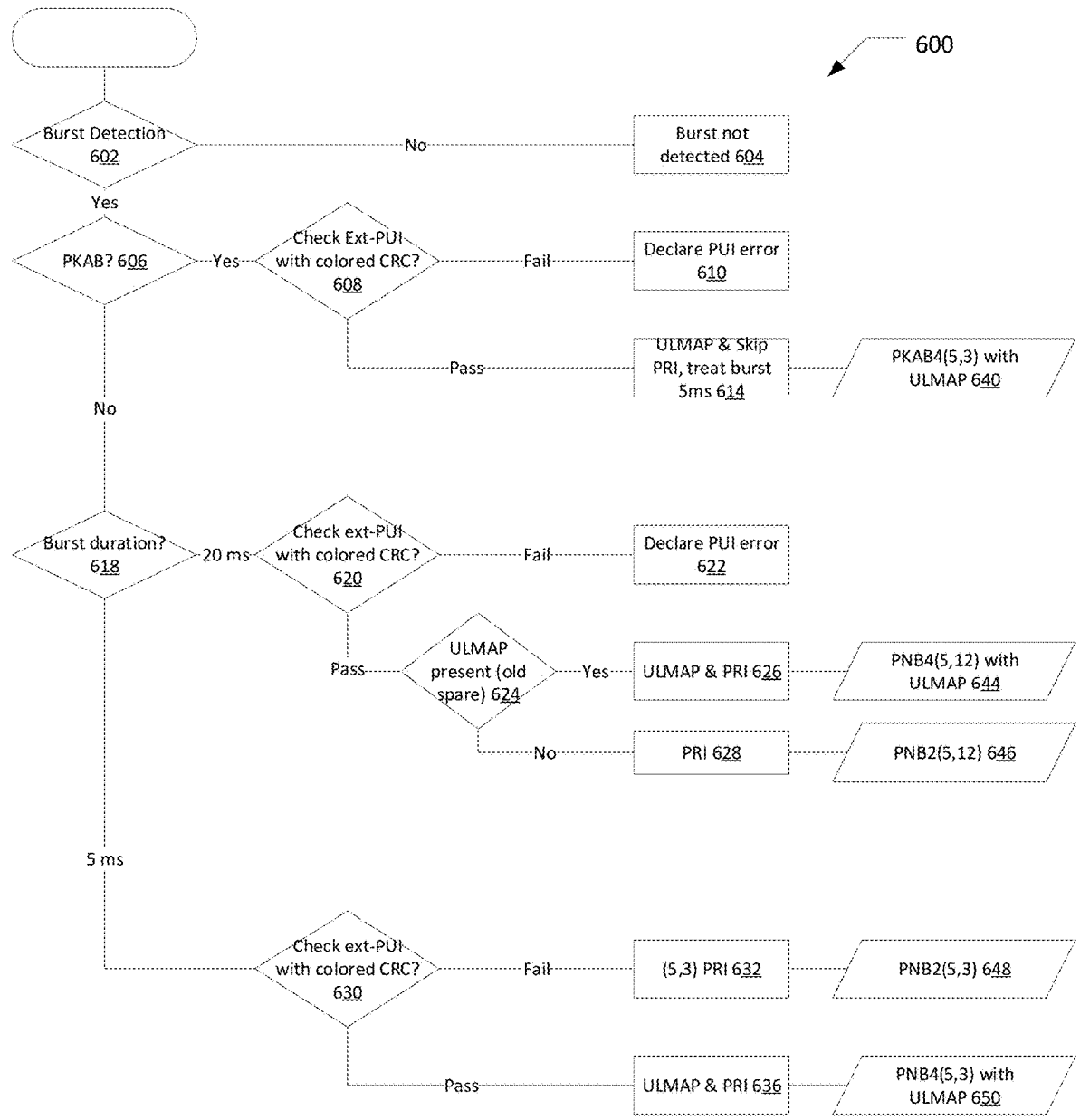
FIG. 6 illustrates a receive processing for a next generation terminal in some embodiments.

FIG. 6 illustrates a receive processing for a next generation terminal in some embodiments.

A process 600 for receive processing for a new terminal to handle legacy and next generation burst types over a common carrier is disclosed. The burst types may include burst types PKAB(5,3) 640, PNB4(5,12) 644, PNB2(5,12) 646, PNB2(5,3) 648, and PNB4(5,3) 650.

A next generation terminal may perform burst detection 602 using a PUI decoder metric and decoded PUI MCS. If the decoder metric is lower than a predefined threshold, the terminal declares a burst not detected per 604 and repeats the receiver process with next received burst; otherwise a burst detected is declared. When a burst detected is declared, the terminal parses PUI and EXT PUI fields and performs the processing as shown per 606, 608, 610, 612, 614, 618, 620, 622, 624, 626, 628, 630, 632 and 636.

Exemplary Burst Formats

In addition to supporting the legacy burst formats, the present teachings disclose new burst formats. The new burst formats may have identical durations as the defined durations of the legacy burst formats, for example, 5 ms, 20 ms. Moreover, the positioning and durations of various guards and unique words in the new burst formats may be identical as the defined positioning and durations of the legacy formats. In some embodiments, the modulations and codings used in the ULMAP and PRI may not be supported by the legacy terminals. In the example, the QPSK (Quadrature Phase Shift Keying) or APSK (Amplitude Phase Shift Keying) are exemplary. The generic term QPSK covers specific implementations such as pi/4-QPSK and the like.

FIG. 7A and FIG. 7B each illustrate an exemplary 20 ms burst format according to various embodiments.

FIG. 7A illustrates a 20 ms burst format including a ULMAP segmented into two portions with a unique word disposed between the two portions. The second portion may have a duration of 2.5 ms between positions 68 to 92. Exemplary modulations and codings for this new burst format are listed in the following table. In some embodiments, the burst format of FIG. 7A may be known as GMR-1 4G (5,12) with ULMAP: type 1.

| Field | Supported Coding |
| --- | --- |
| PUI | Golay (24,12) with repetition, QPSK |
| Ext. PUI | Tail Biting Conv. Code with K = 6, punctured rate 5/16 |
| | Payload of 30 bits (including 8 bit CRC bits) coded to 96 bits, QPSK |
| ULMAP | Conv. Code with K = 9, Rate ½ |
| | Payload of 128 bits (including 8 bit CRC and 8 tail bits), coded to 256 bits and repeated to 512 bits |

| Field | Supported Coding |
|---|---|
| PRI (four code blocks) | QPSK, 16 APSK, and 32 APSK<br>Four LDPC code blocks constitute a PRI with an identical MCS point<br>Total 8 MCS points:<br>Four QPSK, two 16 APSK, and two 32 APSK MCS points. |

FIG. 7B illustrates a 20 ms burst format including a ULMAP and a CH placeholder (reserved for future use or messages), where the ULMAP is segmented into two portions with a unique word disposed between the two portions. The second portion may have a duration of 2.5 ms between positions 68 to 92. Exemplary modulations and codings for this new burst format are listed in the following table. In some embodiments, the burst format of FIG. 7B may be known as GMR-1 4G (5,12) with ULMAP: type 2.

| Field | |
|---|---|
| PUI | Golay (24,12) with repetition, QPSK |
| ULMAP | TB Conv. Code with K = 9, rate 1/2<br>Payload of [45] bits (including [8] bit CRC bits) coded to 90 bits and repeated to 180 bits: could be increased to [53] bits at the expense of more RX processing |

| Field | |
|---|---|
| PUI | Golay (24,12) with repetition, QPSK |
| Ext. PUI | Tail Biting Conv. Code with K = 6, punctured rate 5/16<br>Payload of 30 bits (including 8 bit CRC bits) coded to 96 bits, QPSK |
| ULMAP | Conv. Code with K = 9, Rate ½<br>Payload of 82 bits (including 8 bit CRC and 8 tail bits), coded to 164 bits and repeated to 328 bits |
| CH | Place holder QPSK symbols reserved for future use or messages. [Payload around [46] bits, [TB] Conv. K = [7~9], rate 1/2, & 1× repetition] |
| PRI (four code blocks) | QPSK, 16 APSK, and 32 APSK<br>Four LDPC code blocks constitute a PRI with an identical MCS point<br>Total 8 MCS points:<br>Four QPSK, two 16 APSK, and two 32 APSK MCS points. |

FIG. 7C and FIG. 7D each illustrate an exemplary 5 ms burst format according to various embodiments.

FIG. 7C illustrates a 5 ms burst format separating a ULMAP and extended PUI. In some embodiments, the burst format of FIG. 7C may be known as PNB4(5,3). The presence of the ULMAP may be indicated through a use of spare bits in the extended PUI (similar to indication of presence of ULMAP in the 20 ms burst). This may be conceptually simple and allow unified processing at the receiver. In some embodiments, using the extended PUI and the ULMAP at the same time allows two additional burst types in future.

| Field | |
|---|---|
| PUI | Golay (24,12) with repetition, QPSK |
| Ext. PUI | Tail Biting Conv. Code with K = 6, punctured rate 5/16<br>Payload of 30 bits (including 8 bit CRC) coded to 96 bits, QPSK |
| ULMAP | Tail Biting Conv. Code with K = 6, rate 1/4<br>Payload of [21] bits (including [5] bit CRC) coded to 84 bits, QPSK |
| PRI (single code) | Single (2,6) LDPC code block constitute a PRI<br>Total 8 MCS points:<br>QPSK, two 16 APSK, and two 32 APSK MCS points. |

FIG. 7D illustrates a 5 ms burst format including a ULMAP without an extended PUI. In some embodiments, the burst format of FIG. 7A may be known as PNB4(5,3). Although processing of the burst format of FIG. 7D may not be as uniform as processing of the burst of FIG. 7C, it may be an attractive solution due to its simplicity. Currently processing of the burst format of FIG. 7D is the baseline to minimize terminal RX processing complexity.

| Field | |
|---|---|
| PRI | Single (2,6) LDPC code block constitute a PRI<br>Total 8 MCS points:<br>QPSK, two 16 APSK, and two 32 APSK MCS points. |

FIG. 8 illustrates a method for communicating with a legacy terminal supporting a legacy air interface and a new terminal supporting a next generation air interface according to various embodiments.

A method 800 for communicating with a legacy terminal supporting a legacy air interface and a new terminal supporting a next generation air interface may include an operation 802 to assign a same carrier to the legacy terminal and the new terminal. The method 800 may include operation 804 to receive a terminal identifier and an optional payload for transmission at a MAC/RLC (Media Access Layer/Radio Link Control) layer. The method 800 may include operation 806 to determine if the terminal identifier is associated with the legacy terminal or the new terminal.

The method 800 may include operation 808 to compose, based on the determining, a burst header. The method 800 may include operation 810 to format a burst including the burst header and the optional payload. The method 800 may include operation 812 to transmit the burst.

FIG. 9 illustrates a method for processing a burst at a terminal supporting a next generation air interface according to various embodiments.

A method 900 for processing a burst at a terminal supporting a next generation air interface may include operation 902 to receive burst comprising an extended PUI (public user information). The method 900 may include operation 904 to check an integrity of the extended PUI with a colored CRC (Cyclic Redundancy Check). The method 900 may include operation 906 to extract a ULMAP from the burst when the ULMAP is indicated to be present by the extended PUI.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for processing a burst at a terminal, the method comprising:
   receiving a burst comprising an extended PUI (public user information);
   checking an integrity of the extended PUI with a colored CRC (Cyclic Redundancy Check); and
   extracting a ULMAP (Uplink Map) from the burst when the checking reports a pass and the ULMAP is indicated to be present by the extended PUI,
   wherein the checking is passable when the terminal supports a next generation air interface and the checking reports a failure when the terminal supports a legacy air interface.

2. The method of claim 1, wherein the burst has a duration of 5 ms or 20 ms.

3. The method of claim 1, further comprising declaring an error when the burst has a duration of 20 ms and the checking reports a failure.

4. The method of claim 1, further comprising declaring an error when the burst has a duration of 20 ms and the checking reports a failure.

5. The method of claim 1, wherein the extended PUI and the ULMAP form a combined field in a header of the burst.

6. The method of claim 5, wherein the combined field in a header of the burst is unsupported by a legacy interface.

7. The method of claim 1, further comprising preventing a parsing on a legacy terminal of the extended PUI when the checking reports a failure.

8. The method of claim 1, wherein the checking treats the burst as no burst after the receiving on a legacy terminal.

9. The method of claim 1, further comprising sending, from a gateway, a plurality of extended PUIs in a downlink burst when an uplink allocation has a mix of different burst types with different slot duration and bandwidth.

10. The method of claim 1, wherein the burst comprises an optional payload.

11. The method of claim 1, wherein the next generation air interface supports a MCS (Modulation and Coding Scheme) unsupported by the legacy air interface.

12. The method of claim 1, wherein the ULMAP is modulated differently than other portions of the burst.

13. The method of claim 1, wherein the receiving receives the burst for the new terminal or the legacy on a same carrier.

14. The method of claim 1, wherein the burst comprises a header with a combined field of the extended PUI and the ULMAP, and the combined field is unsupported by the legacy interface.

15. A method for processing a burst at a terminal, the method comprising:
   receiving a burst comprising an extended PUI (public user information);
   checking an integrity of the extended PUI with a colored CRC (Cyclic Redundancy Check); and
   extracting a ULMAP (Uplink Map) from the burst when the checking reports a pass and the ULMAP is indicated to be present by the extended PUI,
   wherein the checking is passable when the terminal supports a next generation air interface,
   wherein the checking reports a failure when the terminal supports a legacy air interface,
   wherein the receiving receives the burst for the new terminal or the legacy on a same carrier,
   wherein the burst comprises a header with a combined field of the extended PUI, and
   wherein the ULMAP and the combined field is unsupported by the legacy interface.

* * * * *